(12) United States Patent
Beitzel et al.

(10) Patent No.: US 11,739,864 B2
(45) Date of Patent: Aug. 29, 2023

(54) HOSE HAVING A TENSILE STRENGTH BRAIDED LAYER

(71) Applicant: Parker-Hannifin Corporation, Cleveland, OH (US)

(72) Inventors: Lee D. Beitzel, Ravenna, OH (US); Ty Henry, Atwater, OH (US); Scott T. Burrowbridge, Stow, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 31 days.

(21) Appl. No.: 17/679,357

(22) Filed: Feb. 24, 2022

(65) Prior Publication Data
US 2022/0268378 A1  Aug. 25, 2022

Related U.S. Application Data

(60) Provisional application No. 63/152,952, filed on Feb. 24, 2021.

(51) Int. Cl.
| | | |
|---|---|---|
| *F16L 11/08* | (2006.01) | |
| *B32B 1/08* | (2006.01) | |
| *B32B 5/12* | (2006.01) | |
| *B32B 27/12* | (2006.01) | |

(52) U.S. Cl.
CPC .............. *F16L 11/088* (2013.01); *B32B 1/08* (2013.01); *B32B 5/12* (2013.01); *B32B 27/12* (2013.01); *B32B 2262/0269* (2013.01); *B32B 2307/54* (2013.01); *B32B 2597/00* (2013.01)

(58) Field of Classification Search
CPC ........ F16L 11/08; F16L 11/083; F16L 11/085; F16L 11/086; F16L 11/088; F16L 11/16; F16L 11/24

USPC ....... 138/123–127, 129, 130, 140, 141, 137, 138/172, 174
See application file for complete search history.

(56) References Cited

U.S. PATENT DOCUMENTS

| | | | | |
|---|---|---|---|---|
| 3,866,632 A | * | 2/1975 | Schaffer | B29C 48/153 138/132 |
| 4,273,160 A | * | 6/1981 | Lowles | F16L 11/088 138/124 |
| 4,403,631 A | * | 9/1983 | Abdullaev | F16L 11/083 138/132 |
| 4,431,034 A | * | 2/1984 | Abdullaev | B29C 70/207 138/132 |
| 5,934,335 A | * | 8/1999 | Hardy | F16L 11/083 138/131 |
| 6,085,798 A | * | 7/2000 | Le Nouveau | F16L 11/16 138/125 |
| 6,807,988 B2 | | 10/2004 | Powell et al. | |

(Continued)

*Primary Examiner* — Patrick F Brinson
(74) *Attorney, Agent, or Firm* — Renner, Otto, Boisselle & Sklar, LLP

(57) ABSTRACT

A hose assembly defines a longitudinal axis and includes an inner core tube, a reinforcement layer, a tensile strength braided layer, and a cover layer. The reinforcement layer surrounds the inner core tube and includes one or more filaments of a fiber. The tensile strength braided layer surrounds the fiber reinforcement layer and includes strands that form a braid pattern. A braid angle of the braid pattern is 10° to 40° relative to the longitudinal axis. A coverage value of the braid pattern is 20% to 50% relative to a surface of a layer adjacent the tensile strength braided layer. The cover layer surrounding the braided layer.

20 Claims, 1 Drawing Sheet

(56) References Cited

U.S. PATENT DOCUMENTS

| | | | | |
|---|---|---|---|---|
| 7,445,029 | B2 * | 11/2008 | Kamiyama | E03C 1/025 138/140 |
| 9,360,138 | B2 * | 6/2016 | Thomson | F16L 11/086 |
| 2004/0154676 | A1 * | 8/2004 | Wilkinson | F16L 11/086 138/123 |
| 2008/0145583 | A1 * | 6/2008 | Bryant | B32B 7/02 428/34.1 |
| 2010/0236655 | A1 * | 9/2010 | Gregrich | B23P 19/00 166/381 |
| 2011/0226375 | A1 * | 9/2011 | Harris | B32B 25/08 138/137 |
| 2013/0192043 | A1 * | 8/2013 | Gregrich | B23P 19/00 29/428 |
| 2014/0202574 | A1 * | 7/2014 | Thomson | B32B 1/08 138/125 |
| 2016/0208961 | A1 * | 7/2016 | Glejbol | F16L 11/082 |
| 2019/0162334 | A1 * | 5/2019 | Westhoff | F16L 11/083 |

* cited by examiner

HOSE HAVING A TENSILE STRENGTH BRAIDED LAYER

RELATED APPLICATIONS

This application claims the benefit of U.S. Provisional Application No. 63/152,952 filed Feb. 24, 2021, which is incorporated herein by reference.

FIELD OF INVENTION

The present invention relates broadly to hoses, and in particular to reinforced hoses having a tensile strength braided layer.

BACKGROUND

In deep well applications, it is often required that a hose be inserted into the well for conducting operations. For example, a hose can be used for supply of fluid (one or more liquids or gasses) into or out of the well. In another example, a hose can be used to supply fluid used in connection with the capping of a well. Deep wells can have considerable depths, in some situations having a depth of up to 5,000 feet or more. In order to provide longitudinal support for the weight of the hose, fluid within the hose, and the attachments at the end of the hose, the hose is often deployed in unison with a tensile strength winch cable or rope. This two-part system creates end user difficulty during deployment of apparatus into and out of the well, such as tangling, twisting, and other problems.

SUMMARY OF INVENTION

The present application provides a hose that includes a tensile strength braided layer. The construction of the hose can provide sufficient tensile strength to support its own weight as well as that of any attachments and the fluid transported within the hose when the longitudinal axis of the hose is oriented vertically. This can allow the hose to be used in applications where a long length of hose is deployed vertically, such as deep well applications. Without the need for an additional winch cable or rope, difficulties from tangling, twisting, and other problems can be eliminated.

According to an aspect of the present disclosure, a hose assembly defines a longitudinal axis and includes: an inner core tube; a reinforcement layer surrounding the inner core tube, the reinforcement layer including one or more filaments of a fiber; a tensile strength braided layer surrounding the fiber reinforcement layer and including strands that form a braid pattern, wherein: a braid angle of the braid pattern is 10° to 40° relative to the longitudinal axis; and a coverage value of the braid pattern is 20% to 50% relative to a layer adjacent and surrounded by the tensile strength braided layer; and a cover layer surrounding the braided layer.

In some embodiments, the strands are each respectively a single fiber.

In some embodiments, at least one of the strands includes two or more fibers.

In some embodiments, the strands are each respectively one or more fibers, and the fibers of the strands include a para-aramid.

In some embodiments, the strands are each respectively one or more fibers, and the fibers of the strands have a tensile strain of 4% or less strain at break.

In some embodiments, the coverage value of the braid pattern is 30% to 40% relative to the layer adjacent and surrounded by the tensile strength braided layer.

In some embodiments, the braid angle of the braid pattern is 20° to 30° relative to the longitudinal axis.

In some embodiments, the tensile strength braided layer has a 3 over, 3 under braid pattern.

In some embodiments, the tensile strength braided layer has a braid pattern with an aspect ratio greater than 9.0.

In some embodiments, the hose assembly further includes an inner liner layer surrounding the reinforcement layer and surrounded by the tensile strength braided layer. The inner liner layer may include polyether urethane. The tensile strength braided layer may include interstices between the strands of the braid pattern, and the cover layer may be at least partially disposed in the interstices.

In some embodiments, the cover layer includes a polyamide or polyurethane.

In some embodiments, a maximum elongation at break of the hose assembly is 4% to 6%.

In some embodiments, the one or more filaments of the fiber of the reinforcement layer are spiral wound in a winding direction around the outer core tube surface.

In some embodiments, the one or more filaments of the fiber of the reinforcement layer include a para-aramid.

In some embodiments, the reinforcement layer is a first reinforcement layer including one or more filaments of a first fiber, and the hose assembly further includes a second reinforcement layer surrounding the first reinforcement layer, the second reinforcement layer including of one or more filaments of a second fiber, the one or more filaments of the second fiber of the second reinforcing layer being spiral wound in a winding direction opposite a winding direction of the one or more filaments of the first fiber.

In some embodiments, the reinforcement layer includes a pitch angle of 40° to 60°.

According to another aspect of the disclosure, a method of forming a hose assembly includes: providing an inner core tube; forming a reinforcement layer surrounding the inner core tube, the reinforcement layer including one or more filaments of a fiber; forming a tensile strength braided layer surrounding the fiber reinforcement layer, the tensile strength braided layer including strands that form a braid pattern, wherein: a braid angle of the braid pattern is 10° to 40° relative to the longitudinal axis; and a coverage value of the braid pattern is 20% to 50% relative to a layer adjacent and surrounded by the tensile strength braided layer; and forming a cover layer surrounding the braided layer.

In some embodiments, the reinforcement layer is a first reinforcement layer including one or more filaments of a first fiber, and the method further includes: forming a second reinforcement layer over at least a part of the first reinforcement layer, the reinforcement layer including one or more filaments of a fiber of a second fiber, the one or more filaments of the second fiber of the second reinforcement layer being spiral wound in a winding direction opposite a winding direction of the one or more filaments of the first fiber; and forming an inner liner layer surrounding the first and second reinforcement layers and surrounded by the tensile strength braided layer.

The foregoing and other features of the invention are hereinafter described in greater detail with reference to the accompanying drawings.

Other systems, devices, methods, features, and advantages of the present invention will be or become apparent to one having ordinary skill in the art upon examination of the following drawings and detailed description. It is intended

DETAILED DESCRIPTION

Aspects of the present disclosure relate to hose assemblies that are suitable for use in various applications. The principles of this present application have particular application to hose assemblies configured to carry fluids in deep well applications, and thus will be described below chiefly in this context. But it will be appreciated that principles of this invention may be applicable to other hose assemblies and applications where it is desirable to provide longitudinal support of those hose. When used in a suitable application, the hose assembly may be configured for engagement between one or more co-axially arranged metal fittings or other quick connectors.

The hose assembly may be formed of at least an inner core tube and a tensile strength braided layer that surrounds the inner core tube. Depending on the application, the hose assembly may further include at least one of a reinforcement layer, inner liner layer, protective cover, or any combination thereof.

Figure 1:
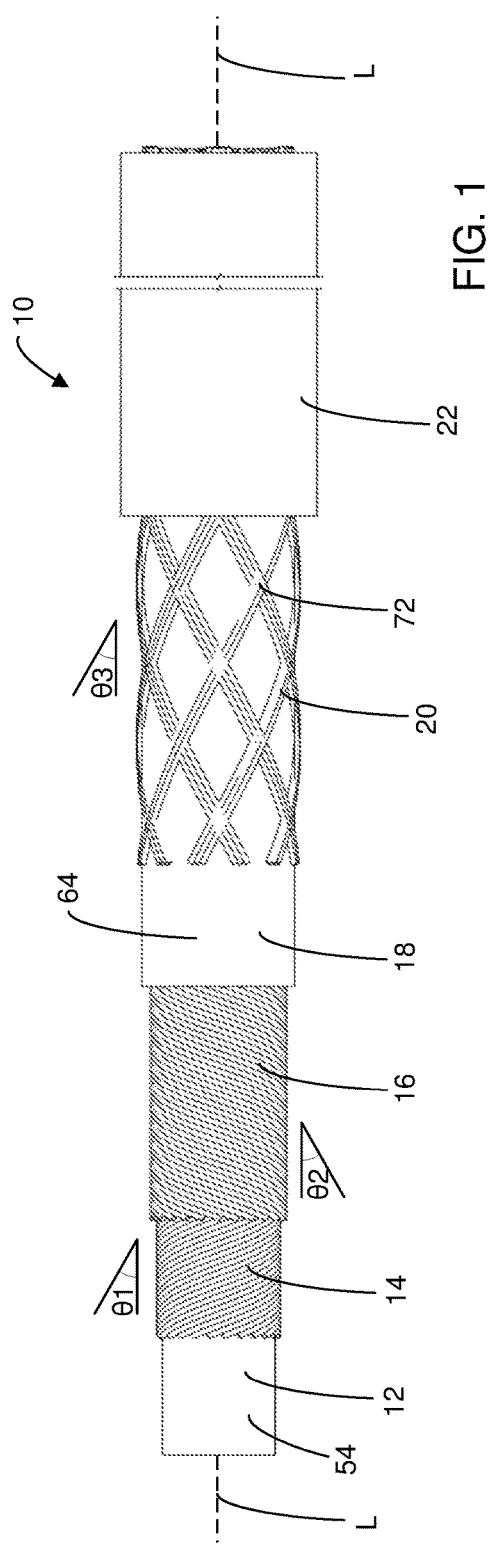
FIG. 1 is a schematic drawing of a perspective view of a hose assembly according to an embodiment of the present application.
Figure 2:
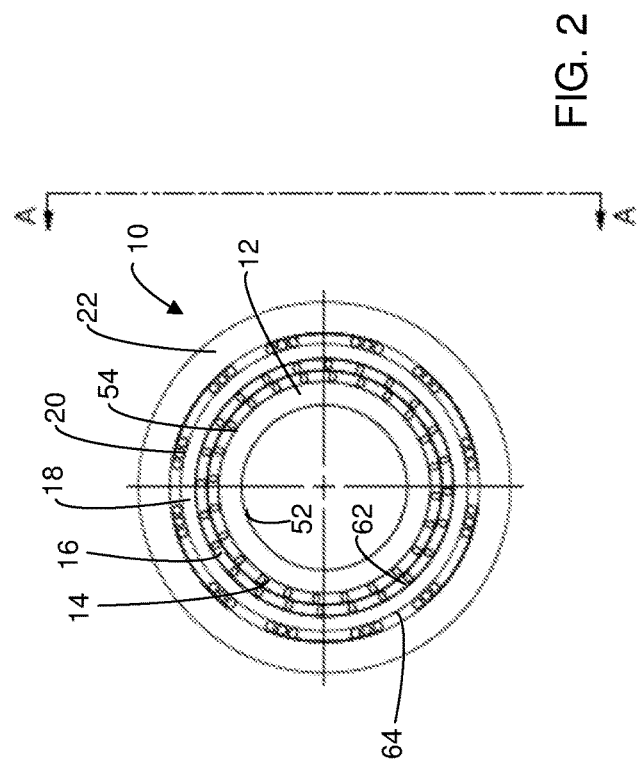
FIG. 2 is a schematic cross-sectional view of the hose assembly shown in FIG. 1.

Referring now to FIGS. 1 and 2, an exemplary hose assembly is designated generally by reference numeral 10. The hose assembly 10 is constructed as a hollow tubular assembly defining a longitudinal axis L and includes an inner core tube 12, a first reinforcement layer 14, a second reinforcement layer 16, an inner liner layer 18, a tensile strength braided layer 20, and a cover layer 22 that are concentrically arranged. The first reinforcement layer 14 surrounds the inner core tube 12; the second fiber reinforcement layer 16 surrounds the first reinforcement layer 14; the inner liner layer 18 surrounds the second fiber reinforcement layer 16; the tensile strength braided layer 20 surrounds the inner liner layer 18; and the cover layer 22 surrounds the tensile strength braided layer 20.

The inner core tube 12 is tubular in shape and configured to receive a fluid flowing through the inner core tube 12. The inner core tube 12 may be formed of any suitable material and the material selected may be dependent on the application and for chemical compatibility with the fluid being handled. In some embodiments, the inner core tube 12 is a thermoplastic (e.g., melt-processible) material such as a polyolefin, polyester, fluoropolymer, polyvinyl chloride, ethylene vinyl alcohol (EVA), polyacetal, polyoxymethylene (POM), silicone, thermoplastic rubber, polyurethane, polyamide, or blends thereof. Exemplary polyamides include Nylon 6, Nylon 6/66, Nylon 11, Nylon 12, Nylon 6/12, or blends thereof. In other embodiments, the inner core tube 12 is a vulcanizable (e.g., thermosetting) material natural or synthetic rubber. Examples include SBR, polybutadiene, EPDM, butyl, neoprene, nitrile, polyisoprene, buna-N, copolymer rubber, or blends thereof. One exemplary blend is ethylene-propylene rubber. In some embodiments, the inner core tube 12 is an extruded material and may be formed by a suitable extrusion process. The inner core tube 12 has an inner surface 52 and an outer surface 54. In some embodiments, the inner surface 52 defines the inner diameter of the hose assembly 10.

The inner diameter of the hose assembly 10 may be any suitable size, and may depend on the particular application of the hose. In some embodiments, the inner diameter of the hose assembly is in the range of ⅛ inch to 1 inch. In other embodiments, the inner diameter of the hose assembly is in the range of ⅛ inch to ½ inch. In one example, the inner diameter of the hose assembly is 3/16 inch. In another example, the inner diameter of the hose assembly is ¼ inch.

Although the inner core tube 12 may be formed of a unitary, single-layer construction, in some embodiments the inner core tube 12 is provided as a composite, multi-layer construction. In such multi-layer construction, inner core tube 12 includes an innermost layer, which defines the inner surface 52 of the inner core tube, and an outermost layer, which defines the outer surface 54 of the inner core tube. In such embodiments, the layers of the inner core tube may be formed of any suitable material such as those described above. In some embodiments, the material of the layers of the inner core tube are different from one another. In other embodiments, the material of the layers of the inner core tube are the same.

In the exemplary embodiment shown in FIGS. 1 and 2, the hose assembly 10 includes two reinforcement layers, first reinforcement layer 14 and a second reinforcement layer 16. The first reinforcement layer 14 concentrically surrounds the outer surface 54 of the inner core tube 12. The first reinforcement layer 14 extends along at least a portion of the outer surface 54 of the inner core tube 12 along the longitudinal axis L of the hose assembly 10. The second reinforcement layer 16 concentrically surrounds the first reinforcement layer 14. The second reinforcement layer 16 extends along at least a portion of the first reinforcement layer 14 along the longitudinal axis L of the hose assembly 10.

It will be appreciated that in other embodiments the hose assembly may include more or fewer reinforcement layers, or a reinforcement layer may be omitted from the assembly. In some exemplary embodiments, the hose assembly may include up to six or more additional reinforcement layers in between the first reinforcement layer 14 and the second reinforcement layer 16. In other exemplary embodiments, the hose assembly may include only one of the first reinforcement layer 14 and the second reinforcement layer 16. In still other embodiments (e.g., in which the hose assembly 10 is subject to lower pressures), the hose assembly 10 may not include a reinforcement layer.

The reinforcement layers may be respectively formed from braided, knitted, wound fiber. For example, from 1 to about 60 ends of monofilament, continuous multi-filament, yarn, stranded, cord, roving, thread, tape, or ply, or short "staple" strands of fiber material may make up each reinforcement layer.

In the example shown in the figures, each of the reinforcement layers 14, 16 is respectively formed from one or more helically wound fibers. For typical applications, the pitch angle of the first reinforcement layer 14, second reinforcement layer 16, and additional reinforcement layers will be selected to be between about 40° to 65°, but particularly may be selected depending upon the desired convergence of strength, elongation, weight, and volumetric expansion characteristics of hose 10. Each of the reinforcement layers may be wound at the same or different pitch angle, and the pitch angles of respective reinforcement layers may be varied with respect to one another to affect the physical properties of the hose. In some embodiments such as the one shown in FIGS. 1 and 2, the pitch angles of the first reinforcement layer 14, the second reinforcement layer 16, and additional reinforcement layers are provided as about the same, but as reversed in successive layers.

The reinforcement layers 14, 16 are oppositely wound in pairs so as to counterbalance torsional twisting effects. For each of the reinforcement layers, from 1 to about 60 parallel ends of fiber may be helically wound under tension in one direction, i.e., either left or right hand, with the next immediately succeeding layer 30 being wound in the opposite direction. For example, the one or more filaments of the fiber of the first reinforcement layer 14 can be spiral wound in a winding direction around the outer core tube surface, and the one or more filaments of the fiber of the second reinforcement layer 16 can be spiral wound in a winding direction opposite the winding direction of the first fiber. The reinforcement layers 14, 16 may be wound as is shown in FIG. 1 directly over the outer surface 18 of core 14, or, alternatively, over one or more intervening reinforcement layers, as having a predetermined pitched angle, referenced at 81 in FIG. 1 for reinforcement layer 14 and at 82 for reinforcement layer 16, measured relative to the longitudinal axis 12 of the hose 10. As is known in the art, the twist may be varied to adjust for example, the flexural fatigue and/or pressure resistance of the hose.

In some embodiments, the spirally wound fiber of each of the reinforcement layers 14, 16 is 420-6600 denier. In other embodiments, the spirally wound fiber of each of the reinforcement layers 14, 16 is 420-3000 denier. In other embodiments, the spirally wound fiber of each of the reinforcement layers 14, 16 is 1000-2000 denier.

The reinforcement layers 14, 16 cooperatively provide a high-pressure rating with low volumetric expansion to the hose 10. The compact spiral construction of the reinforcement layers 14, 16 provides both fast response over a long length hose assembly and high efficiency of the reinforcement material strength. In some embodiments, the burst strength of the hose assembly is at least 15,000 psi. In other embodiments, the burst strength of the hose assembly is at least 20,000 psi. In other embodiments, the burst strength of the hose assembly is at least 15,000 psi to 30,000 psi. In other embodiments, the burst strength of the hose assembly is at least 20,000 psi to 30,000 psi.

Additional details of appropriate pressure reinforcement layers are disclosed in U.S. Pat. No. 6,807,988, titled "Thermoplastic reinforced hose construction" issued Oct. 26, 2004, and herein incorporated by reference.

The reinforcement layers include one or more filaments of a fiber. The fiber material of the reinforcement layers may be a natural or synthetic polymeric material such as a nylon, cotton, polyester, polyamide, aramid (e.g., para-aramid), polyolefin, polyvinyl alcohol (PVA), polyvinyl acetate, or polyphenylene bezobisoxazole (PBO), stainless steel, galvanized steel, brass, zinc wire, or zinc-plated wire, or other metal wire, or blends thereof. In some embodiments, the first reinforcement layer 14, the second reinforcement layer 16, and any additional reinforcement layers may be made of the same type of material. In an example, both the first reinforcement layer 14 and the second reinforcement layer are made of a para-aramid. In other embodiments, one or more of the first reinforcement layer 14, the second reinforcement layer 16, and any additional reinforcement layers may be made of different respective materials.

The tension and area coverage at which the reinforcement layers are braided, knitted, or wound may be varied to achieve the desired flexibility, which may be measured by bend radius, flexural forces, or the like, of the hose assembly 10. For the first reinforcement layer 14 and second reinforcement layer 16 depicted in FIGS. 1 and 2, the constituent yarns or other ends generally will be applied at or near about 100% coverage such that substantially no space or interstitial area exists between each successive turn.

Each of the reinforcement layers may be bonded to its immediately succeeding layer. The reinforcement layer may be chemically or mechanically bonded. By "chemically bonded," it is meant that the layers are bonded together, such as by fusion or cross-linking, directly or indirectly through an intermediate adhesive, resin, or other interlayer. The chemical bond may be either covalent, ionic, or hydridic, i.e., hydrogen, bridge bonding, and results, along with any mechanical bonding, in the formation of an integral reinforcement structure exhibiting, for example, an interlayer bond. In an exemplary embodiment, the bonding agent is provided as an adhesive in the form of a melt-processible or vulcanizable material which is extruded or otherwise applied in a molten, softened, or otherwise flowable phase. The reinforcement layer then may be wound over the adhesive. "Soften" is used herein in its broadest sense to indicate a transition from a form-stable crystalline or glassy solid phase to a flowable liquid, semi-liquid, or otherwise viscous phase which may be generally characterized as exhibiting intermolecular chain rotation. In an alternative embodiment, a moisture cure urethane, or an epoxy, silicone, or other adhesive may be used. For any number of reinforcement layers provided in the construction of hose assembly 10, an adhesive may be interposed between each layer and each successive layer to effect a bond.

With continued reference to FIGS. 1 and 2, the inner liner layer 18 concentrically surrounds the reinforcement layers 14, 16, and inner core tube 12. The inner liner layer 18 extends along at least a portion of the second reinforcement layer 16 along the longitudinal axis L of the hose assembly 10. In embodiments of the hose assembly that omit the second reinforcement layer 16 or that omit all of the reinforcement layers, the inner liner layer 18 may extend along at least a portion of the immediately adjacent layer that the inner liner layer 18 surrounds (e.g., the first reinforcement layer 16 or the inner core tube 12).

The inner liner layer 18 may be formed of any suitable material. In some embodiments, the inner liner layer 18 is a thermoplastic (e.g., melt-processible) material such as a polyolefin, polyester, fluoropolymer, polyvinyl chloride, ethylene vinyl alcohol (EVA), polyacetal, polyoxymethylene (POM), silicone, thermoplastic rubber, polyurethane, polyamide, or blends thereof. Exemplary polyurethanes include polyether urethane and polyester urethane. Exemplary polyamides include Nylon 6, Nylon 6/66, Nylon 11, Nylon 12, Nylon 6/12, or blends thereof. In other embodiments, the inner liner layer 18 is a vulcanizable (e.g., thermosetting) material natural or synthetic rubber. Examples include SBR, polybutadiene, EPDM, butyl, neoprene, nitrile, polyisoprene, buna-N, copolymer rubber, or blends thereof. One exemplary blend is ethylene-propylene rubber. In some embodiments, the inner liner layer 18 is an extruded material and may be formed by a suitable extrusion process. The inner liner layer 18 has an inner surface 62 and an outer surface 64.

The inner liner layer 18 is optionally included as a part of the hose assembly 10. In the embodiment shown in FIGS. 1 and 2, the inner liner layer 18 is included between the second reinforcement layer 16 and the tensile strength braided layer 20 as shown in FIGS. 1 and 2. In other embodiments, the inner liner layer 18 is omitted.

The tensile strength braided layer 20 concentrically surrounds the inner liner layer 18, reinforcement layers 14, 16, and inner core tube 12. The tensile strength braided layer 20 extends along at least a portion of the inner liner layer 18 along the longitudinal axis L of the hose assembly 10. In embodiments of the hose assembly that omit the inner liner layer 18, second reinforcement layer 16, and/or all of the reinforcement layers, the tensile strength braided layer 20 may extend along at least a portion of the immediately adjacent layer that the tensile strength braided layer 20 surrounds (e.g., the second reinforcement layer 16, the first reinforcement layer 14, or the inner core tube 12).

The tensile strength braided layer 20 is formed of a braid of strands 72 of low stretch, high strength fiber such as para-aramid, metal wire, metal cord, PVA, polyester, and blends thereof. In some embodiments, the fibers making up the strands 72 of the tensile strength braided layer 20 possess a tensile strain of 4% or less at break. In one example, the fibers making up the strands 72 is a para-aramid material. In some embodiments, each strand 72 of the braid is a single fiber. In other embodiments, at least one of the strands 72 of the braid includes two or more fibers. For example, each strand 72 of the braid may include two or more fibers. In another example, one or more of the strands 72 of the braid includes a single fiber strand and one or more strands 72 includes two or more fibers.

In some embodiments, the fibers making up the strands 72 are 420-6600 denier. In other embodiments, the fibers making up the strands 72 are 1000-4000 denier. In other embodiments, the fibers making up the strands 72 are 2500-3500 denier.

The braid pattern and design of the tensile strength braided layer 20 provides improved use of the material strength of the fibers in the longitudinal direction of the hose assembly 10. In some embodiments, the tensile load capability of the braid is 3,000 pounds to 8,000 pounds. In other embodiments, the tensile load capability of the braid is 5,000 pounds to 8,000 pounds. In other embodiments, the tensile load capability of the braid is 5,000 pounds to 6,000 pounds.

The braid pattern and design also can provide low stretch in the longitudinal direction of the hose 10. In some embodiments, the maximum elongation at break for the hose assembly 10 including the tensile strength braided layer 20 is 3% to 8%. In other embodiments, the maximum elongation at break for the hose assembly 10 including the tensile strength braided layer 20 is 4% to 6%.

The tensile strength braided layer 20 has a low braid angle 83 relative to the longitudinal axis L. In some embodiments, the braid angle 83 of the tensile strength braded layer 20 relative to the longitudinal axis L is 10° to 40°. In other embodiments, the braid angle 83 of the tensile strength braded layer 20 relative to the longitudinal axis L is 20° to 30°. In other embodiments, the braid angle 83 of the tensile strength braded layer 20 relative to the longitudinal axis L is 23° to 28°.

In some embodiments, the braid has a 3 over, 3 under braid pattern. The tensile strength braided layer 20 has a high aspect ratio (i.e., ratio of the length of undulation and height of undulation pattern of the braded material in the braid pattern). For example, the 3 over, 3 under braid pattern can help to provide a longer in length and shorter in height undulation pattern of the braded material. For reinforcement applications, a larger aspect ratio is advantageous for reducing cross over points of the strands where stress accumulates. In some embodiments, the aspect ratio of the braid is 9.0 or greater. In other embodiments, the aspect ratio of the braid is 9.0 to 30.0. In other embodiments, the aspect ratio of the braid is 9.0 to 20.0. In other embodiments, the aspect ratio of the braid is 9.0 to 15.0. The high aspect ratio creates a very low stretch braid design in nature due to the longer in length and shorter in height undulation pattern of the braided material.

In some embodiments, the braid is formed with a 3 over, 3 under braid design using 36 strands (each strand respectively being a single fiber or a bundle of two or more fibers). One exemplary machine for forming the braid design is a MR-15 36-Carrier machine available from Mayer Braidtech GmbH. The use of the 36 strands can provide more fiber resulting in higher tensile strength and lower stretch per unit of load. While the use of a high number of strands can result in a lower aspect ratio, the 3 over, 3 under braid pattern can help to maintain the high aspect ratio.

In other embodiments, the braid is formed with a 3 over, 3 under braid design using 24 strands (each strand respectively being a single fiber or a bundle of two or more fibers). One exemplary machine for forming the braid design is a MR-15 24-Carrier machine available from Mayer Braidtech GmbH. The use of fewer strands can provide a higher aspect ratio for the braid pattern. However, with fewer strands there may be need to add more material strength per strand (e.g., larger strands). This can increase braid coverage and provide smaller interstices between the braids.

With reference to FIG. 1, the tensile strength braided layer 20 covers a portion of the layer adjacent and surrounded by the tensile strength braided layer. In the example shown, at those portions along the longitudinal axis L where the tensile strength braided layer is provided 20, a portion of the outer surface 64 of the inner liner layer 18 is not covered. In some embodiments, the tensile strength braided layer 20 has a coverage value 20% to 50% relative to the layer adjacent and surrounded by the tensile strength braided layer. In other embodiments, the tensile strength braided layer 20 has a coverage value 20% to 40% relative to the layer adjacent and surrounded by the tensile strength braided layer. In other embodiments, the tensile strength braided layer 20 has a coverage value 25% to 35% relative to the layer adjacent and surrounded by the tensile strength braided layer. The low coverage braid provides interstices between the strands 72 of the braid, which provides additional surface area for a layer concentrically surrounding the tensile strength braided layer 20 cover material (e.g., cover layer) to attach or bond to.

The tensile strength braided layer 20 may be bonded to the layer adjacent and surrounded by the tensile strength braided layer 20. In the example shown in FIGS. 1 and 2, the tensile strength braided layer 20 may be bonded to the outer surface 64 of the inner liner layer 18. The tensile strength braided layer 20 may be chemically or mechanically bonded. In an exemplary embodiment, the bonding agent is provided as an adhesive in the form of a melt-processible or vulcanizable material which is extruded or otherwise applied in a molten, softened, or otherwise flowable phase. The reinforcement layer then may be wound over the adhesive. "Soften" is used herein in its broadest sense to indicate a transition from a form-stable crystalline or glassy solid phase to a flowable liquid, semi-liquid, or otherwise viscous phase which may be generally characterized as exhibiting intermolecular chain rotation. In an alternative embodiment, a moisture cure urethane, or an epoxy, silicone, or other adhesive may be used.

The cover layer 22 concentrically surrounds the tensile strength braided layer 20, inner liner layer 18, reinforcement layers 14, 16, and inner core tube 12. The cover layer 22 extends along at least a portion of the tensile strength braided layer 20 along the longitudinal axis L of the hose assembly 10.

The cover layer 22 may be formed of any suitable material. In some embodiments, the cover layer 22 is a thermoplastic (e.g., melt-processible) material such as a polyolefin, polyester, polyether, fluoropolymer, polyvinyl chloride, ethylene vinyl alcohol (EVA), polyacetal, polyoxymethylene (POM), silicone, thermoplastic rubber, polyurethane, polyamide, or blends thereof. In some embodiments, the is a polyamide, polyurethane, polyester/polyether blend, or blends thereof. Exemplary polyurethanes include polyether urethane and polyester urethane. Exemplary polyamides include Nylon 6, Nylon 6/66, Nylon 11, Nylon 12, Nylon 6/12, or blends thereof. In other embodiments, the cover layer 22 is a vulcanizable (e.g., thermosetting) material natural or synthetic rubber. Examples include SBR, polybutadiene, EPDM, butyl, neoprene, nitrile, polyisoprene, buna-N, copolymer rubber, or blends thereof. One exemplary blend is ethylene-propylene rubber. The cover layer has low coefficient of friction and abrasion resistance. In some embodiments, the cover layer 22 has a durometer of 80 shore A or greater. In other embodiments, the cover layer 22 has a durometer of 90 shore A or greater. In other embodiments, the cover layer 22 has a durometer of 90 shore A to 100 shore A.

In some embodiments, the inner liner layer 18 is an extruded material and may be formed by a suitable extrusion process. As described above, the interstices between the strands of the braid of the tensile strength braided layer 20 provide additional surface area for the cover layer to attach to. With the cover layer disposed in the interstices as well as covering the braid pattern, the tensile strength braided layer 20 can be maintained in its originally intended position.

The outer diameter of the hose assembly 10 may be any suitable diameter, and may be dependent on the number of layers in the hose. In some embodiments, the outer diameter of the hose assembly is in the range of ¼ inch to 1.5 inch. In other embodiments, the outer diameter of the hose assembly is in the range of ¼ inch to ¾ inch. In one example, the outer diameter of the hose assembly is ½ inch. In another example, the outer diameter of the hose assembly is 7/16 inch.

In an exemplary method of forming the hose assembly 10 shown in FIGS. 1 and 2, an inner core tube 12 is provided. The inner core tube 12 may be extruded using a suitable thermoplastic or thermoset material as described above. In the example, the inner core tube may be a polyamide material. Adhesive is applied to the outer surface 54 of the inner core tube and a first reinforcement layer 14 is wrapped around the inner core tube 12. Adhesive is applied to the first reinforcement layer 14 and a second reinforcement layer 16 is wrapped around the first reinforcement layer 14 in an opposite direction of the first reinforcement layer. In the example, the first reinforcement layer 14 and the second reinforcement layer 16 may be made of a para-aramid and may have a denier of 1500. An inner liner layer 18 is formed on the second reinforcement layer 16 by extrusion. The extruded inner liner layer 18 may be a suitable thermoplastic or thermoset material as described above. In the example, the inner liner layer 18 is a polyether urethane material. Adhesive is applied to the outer surface of the inner liner layer 18 and a tensile strength braided layer 20 is braded around the inner liner layer 18. In the example, the tensile strength braided layer 20 is made of strands of single para-aramid fibers and may have a denier of 3000. A cover layer 22 is formed on the tensile strength braided layer 20. The cover layer 22 may be extruded using a suitable thermoplastic or thermoset material as described above. In the example, the cover layer 22 is a polyamide material.

The hose assembly possesses sufficient tensile strength to support its own weight in addition to that of the fluid within the hose and any attachments. In an exemplary deep well application, the hose assembly 10 is attached to a fitting (not shown). The fitting attaches to each of the first reinforcement layer 14, the second reinforcement layer 16, and the tensile strength braided layer 20. The attached fitting provides pressure containment, fluid conveyance, and a lifting capability to the hose 10. The maximum elongation at break for the hose assembly 10 is between 4% and 6%. An exemplary suitable working load for the application is calculated as follows: a 100 pound well plug, weight of the hose (335 pounds at 5,000 ft), and the weight of the fluid (60 pounds at 5,000 ft hose filled). This results in a 495-pound requirement for a working tensile load. In embodiments of the hose assembly, at 2% hose elongation, the minimum reaction tensile load is 800 pounds, resulting in 1.6 design factor to the required working load. The hose assembly 10 exhibits a minimum break strength or fitting pull off force of 2,500 pounds resulting in a 5 to 1 design factor of ultimate tensile strength to required working load.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hose assembly, the hose assembly defining a longitudinal axis and comprising:
   an inner core tube;
   a reinforcement layer surrounding the inner core tube, the reinforcement layer comprising one or more filaments of a fiber;
   a tensile strength braided layer surrounding the fiber reinforcement layer and comprising strands that form a braid pattern, wherein:
      a braid angle of the braid pattern is 10° to 40° relative to the longitudinal axis; and
      a coverage value of the braid pattern is 20% to 50% relative to a layer adjacent and surrounded by the tensile strength braided layer; and
   a cover layer surrounding the braided layer.

2. The hose assembly of claim 1, wherein the strands are each respectively a single fiber.

3. The hose assembly of claim 1, wherein at least one of the strands includes two or more fibers.

4. The hose assembly of claim 1, wherein the strands are each respectively one or more fibers, and the fibers of the strands comprise a para-aramid.

5. The hose assembly of claim 1, wherein the strands are each respectively one or more fibers, and the fibers of the strands have a tensile strain of 4% or less strain at break.

6. The hose assembly of claim 1, wherein the coverage value of the braid pattern is 30% to 40% relative to the layer adjacent and surrounded by the tensile strength braided layer.

7. The hose assembly of claim 1, wherein the braid angle of the braid pattern is 20° to 30° relative to the longitudinal axis.

8. The hose assembly of claim 1, wherein the tensile strength braided layer has a 3 over, 3 under braid pattern.

9. The hose assembly of claim 1, wherein the tensile strength braided layer has a braid pattern with an aspect ratio greater than 9.0.

10. The hose assembly of claim 1, further comprising an inner liner layer surrounding the reinforcement layer and surrounded by the tensile strength braided layer.

11. The hose assembly of claim 10, wherein the inner liner layer comprises polyether urethane.

12. The hose assembly of claim 10, wherein the tensile strength braided layer comprises interstices between the strands of the braid pattern, and the cover layer is at least partially disposed in the interstices.

13. The hose assembly of claim 1, wherein the cover layer comprises a polyamide or polyurethane.

14. The hose assembly of claim 1, wherein a maximum elongation at break of the hose assembly is 4% to 6%.

15. The hose assembly of claim 1, wherein the one or more filaments of the fiber of the reinforcement layer are spiral wound in a winding direction around the outer core tube surface.

16. The hose assembly of claim 1, wherein the one or more filaments of the fiber of the reinforcement layer comprise a para-aramid.

17. The hose assembly of claim 1, wherein the reinforcement layer is a first reinforcement layer comprising one or more filaments of a first fiber, and the hose assembly further comprises a second reinforcement layer surrounding the first reinforcement layer, the second reinforcement layer comprising of one or more filaments of a second fiber, the one or more filaments of the second fiber of the second reinforcement layer being spiral wound in a winding direction opposite a winding direction of the one or more filaments of the first fiber.

18. The hose assembly of claim 1, wherein the reinforcement layer comprises a pitch angle of 40° to 60°.

19. A method of forming a hose assembly comprising:
providing an inner core tube;
forming a reinforcement layer surrounding the inner core tube, the reinforcement layer comprising one or more filaments of a fiber;
forming a tensile strength braided layer surrounding the fiber reinforcement layer, the tensile strength braided layer comprising strands that form a braid pattern, wherein:
 a braid angle of the braid pattern is 10° to 40° relative to the longitudinal axis; and
 a coverage value of the braid pattern is 20% to 50% relative to a layer adjacent and surrounded by the tensile strength braided layer; and
forming a cover layer surrounding the braided layer.

20. The method of claim 19, wherein the reinforcement layer is a first reinforcement layer comprising one or more filaments of a first fiber, and the method further comprises:
forming a second reinforcement layer over at least a part of the first reinforcement layer, the reinforcement layer comprising one or more filaments of a fiber of a second fiber, the one or more filaments of the second fiber of the second reinforcement layer being spiral wound in a winding direction opposite a winding direction of the one or more filaments of the first fiber; and
forming an inner liner layer surrounding the first and second reinforcement layers and surrounded by the tensile strength braided layer.

* * * * *